April 26, 1949.  R. W. BOOTH  2,468,288

CONTROL UNIT

Filed May 23, 1945  2 Sheets-Sheet 1

INVENTOR.
Roger W. Booth.
BY Bair & Freeman
Atty's.

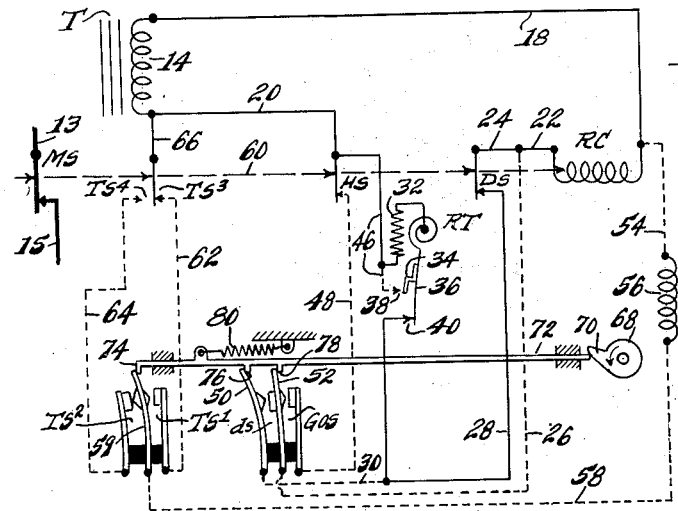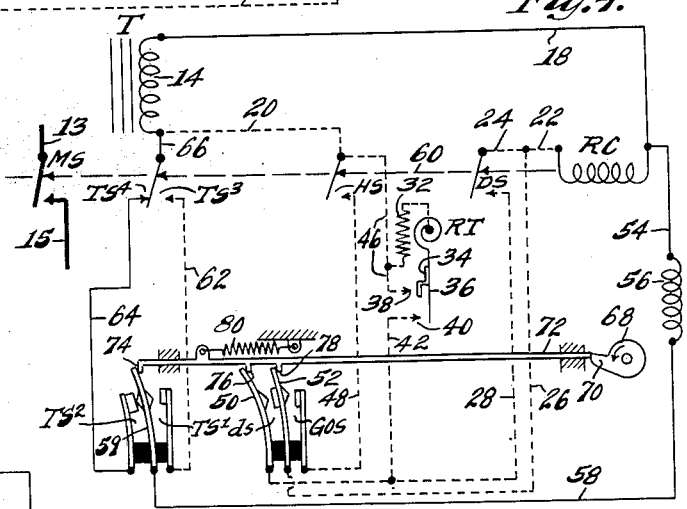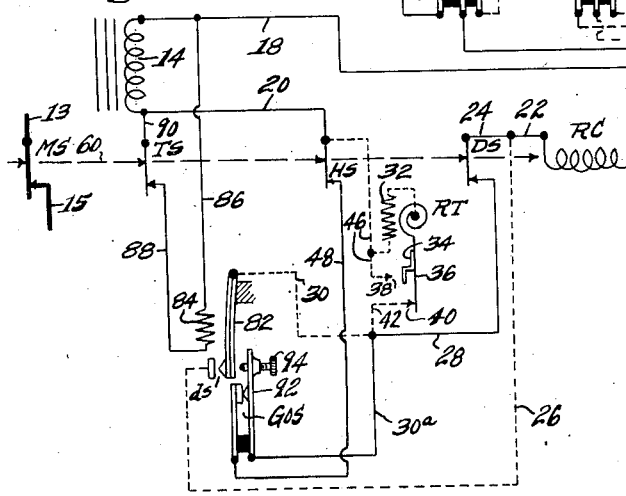

Patented Apr. 26, 1949

2,468,288

UNITED STATES PATENT OFFICE 2,468,288

CONTROL UNIT

Roger W. Booth, Marshalltown, Iowa, assignor to The Lennox Furnace Co., Marshalltown, Iowa, a corporation of Iowa Application May 23, 1945, Serial No. 595,349

1 Claim. (Cl. 236—46)

This invention relates to a control unit adaptable to control a temperature changing mechanism such as a burner or cooling equipment, the control unit having means to provide a definitely timed "guaranteed on" period of operation, regardless of how short a call for heat or cooling occurs at a room thermostat or the like.

One object of the invention is to provide a control unit which operates satisfactorily when using a very sensitive room thermostat, that is, one having a substantially zero differential of operation, as described in the copending application of Morris B. Diamond, Serial No. 593,711, filed May 14, 1945, the present invention, over and above the Diamond application, disclosing timing mechanism which is independent of the temperature changing mechanism and providing a definitely controlled "guaranteed on" timing period for the mechanism following initiation of operation thereof by the room thermostat.

Another object is to provide a means in a burner control circuit or the like which will guarantee a minimum "on" period of operation, even though the thermostat closes and then immediately opens due to a slight rise in the room temperature ambient to the thermostat itself (as, for instance, because of vibration), thus making it possible to operate the burner efficiently. In this connection, inefficiency is experienced when the burner operation is less than about 2 to 6 minutes, depending upon the type of fuel used, the type of furnace, the heating rate of the furnace, etc. In the case of cooling equipment there is likewise desired a "guaranteed on" period of operation during which the cooling mechanism operates without shutting off too soon to secure maximum efficiency.

The warm air heating industry has sold several hundred thousand forced warm air heating systems (many of them automatically fired) in the last six or seven years. Only a few of these are producing what is considered satisfactory results. The majority of forced air installations are such that it is objectionable to run the blower continuously because the air stream discharging from the warm air register goes out into the occupied space where it frequently strikes a room occupant directly. When a blower runs continuously the discharged air will frequently be at a temperature of 80° F. If such air strikes a room occupant at even a low velocity it gives the sensation of a chilly draft. Blowers, however, are desirable, as greater efficiency is had from a warm air system when they are used.

It has been found desirable in warm air installations to locate the warm air registers where the discharging air stream cannot strike a room occupant until it has lost its velocity. Such a position, for instance, may be in the wall a foot or so from the ceiling. This makes it possible to run the blower almost continuously. It is impossible to do a satisfactory job of heating with any kind of heating plant unless the flow of warmth is continuous. With the flow of air continuous from the furnace it then becomes necessary to cycle the heat source very frequently in order to modulate the temperature of the circulating warm air to the needs of the house. Once this is accomplished, the heating result approaches perfection.

The usual type of room thermostat does not cycle very frequently because it has a comparatively wide differential of operation, and this is particularly true where snap acting devices are used in connection with the thermostats. The addition of a heating element in the room thermostat to create "heat acceleration" or "heat anticipation" has improved the results somewhat. However, the sensitivity of room temperature regulation with these types of thermostats is not sufficient to be entirely satisfactory.

To further improve results with such conventional thermostats, various arrangements have been attempted. Some of these arrangements involve two-stage room thermostats and a dual arrangement of limit controls at the furnace. This creates the effect of a two-stage flame whereas actually there is but a single burner. Even this arrangement has its shortcomings.

It is therefore another object of the present invention to provide an arrangement which makes it possible to use a substantially zero differential thermostat but still give a "guaranteed on" time for the burner which eliminates chattering of the burner when the thermostat itself chatters. Where the thermostat has substantially zero differential, it is so sensitive that it is practically impossible to prevent vibration of the thermostat contacts when they are just opening or just closing. By eliminating the danger of chattering the burner or producing erratic or jumpy operation thereof but still preserve the supersensitive zero differential type of thermostat action, I have provided a timer mechanism to guarantee a minimum "on" period for the burner each time the room thermostat closes and after the expiration of the "guaranteed on" period of time the burner control circuit is under control of the room thermostat itself for the shutdown operation when the thermostat has been satisfied. The timer mechanism which guarantees a minimum "on" period is disclosed as being in the form of an electric clock or warp switch which are electrically energized by operation of the room thermostat so as to provide clearly defined timing periods which are not a function of the rate of temperature change of the burner in the heating or cooling mechanism.

Another object is to combine such an arrangement with a heat accelerated type of thermostat, with control of the accelerator in relation to the thermostat being such that soon after the thermostat closes the acceleration heater is shunted out of the circuit and comes back in again only after the expiration of the timing period for then accelerating the opening of the thermostat to avoid overrunning the temperature in the room.

Still another object is to provide a thermostat which is of two-stage type so that if the room temperature continues to fall, the second stage operation will come into effect and shunt out the heat accelerator so that the burner will operate continuously until such time as the room temperature has risen sufficiently to permit the acceleration heater to come back into the circuit and again perform its function of accelerating the opening of the room thermostat to prevent an overrun of room temperature.

An additional object is to provide timer switches controlled by the room thermostat through the medium of a relay by means of a timer mechanism, which mechanism has timer switches operating in conjunction with each other to provide a "guaranteed on" timing period, at the expiration of which control is taken over by the room thermostat and the timer is stopped in a position ready to complete its cycle when the room thermostat opens, the timer then completing the cycle and again stopping in its initial position for the beginning of the next cycle when the room thermostat closes again.

Another additional object is to provide the timing mechanism in the form of an electric clock or the like and to provide a modification wherein the timing mechanism is a warp switch accomplishing substantially the same control functions as the timing clock.

With these and other objects in view, my invention consists in the construction, arrangement and combination of the various parts of my control system whereby the objects contemplated are attained, as hereinafter more fully set forth, pointed out in my claim and illustrated in the accompanying drawings, wherein:

Fig. 3 is a similar diagrammatic view showing the circuit at the expiration of the time period of the timing mechanism;

Fig. 4 is a similar diagrammatic view showing the operating cycle being finished as a result of opening of the room thermostat; and Fig. 5 is an electro-diagrammatic view of a modified control circuit using a warp switch timer instead of a clock timer, the room thermostat having closed and the warp switch being shown in an intermediate position.

Figure 1:
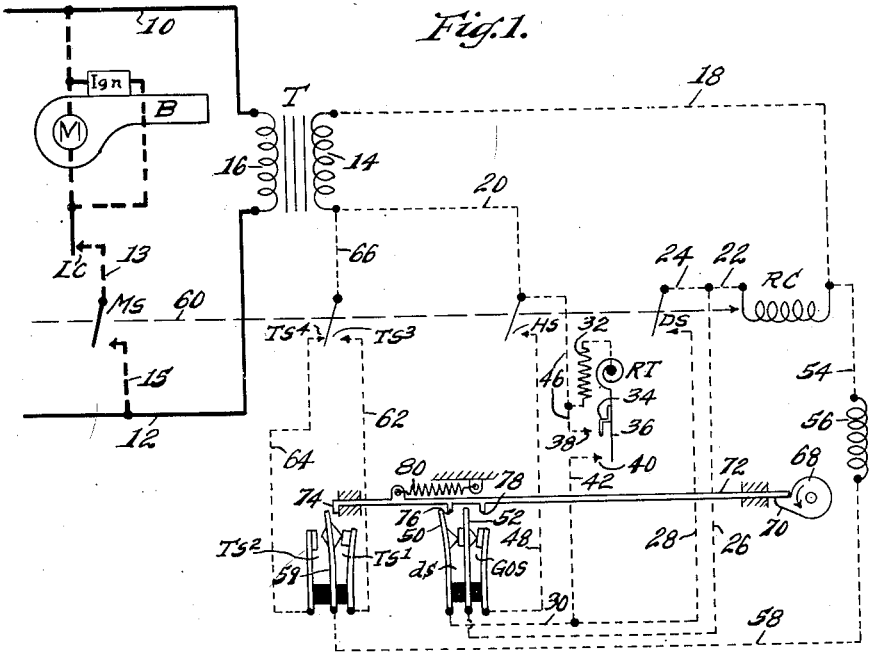
Fig. 1 is an electro-diagrammatic view of a burner control embodying my invention and showing the burner shut down, the wires in which current is flowing being shown in solid lines and those in which there is no current being shown in dotted lines.

On the accompanying drawings I have used the reference numerals 10 and 12 to indicate current supply wires such as those which supply 110-volt current to the burner. The burner itself is shown at B, the motor for operating it at M, and the ignition mechanism for the burner at Igm. The motor and the ignition mechanism are controlled by a motor switch MS and also by the usual limit control LC mounted in the plenum chamber of the furnace for preventing the furnace from getting too hot when there are extended calls for heat by the room thermostat. The 110-volt circuit is shown in heavy lines and includes wires 13 and 15 connected with the motor switch MS.

I am describing a burner circuit, whereas in place of the burner, cooling mechanism may be controlled by the motor switch MS in response to a room thermostat which closes on rise of room temperature, instead of upon drop of room temperature as in the case of a burner. As my control unit is applicable to temperature changing mechanism of either the burner type or the cooling type, I deem it unnecessary to go into detail with respect to a cooling mechanism circuit, as the control would be the same in either case, except for reversal in temperature change.

The control circuit for operating the motor switch MS is shown in light lines, as it is a light voltage circuit supplied with current, for instance, from a secondary coil 14 of a transformer T, the primary of which is shown at 16 and connected directly across the line wires 10 and 12. The circuit includes a pair of supply wires 18 and 20 in addition to the following elements: 22 to 48, 54 to 58, 62, 64, 66, RC, HS, RT, DS, $ds$, GOS, TS$^1$, TS$^2$, TS$^3$ and TS$^4$. The elements 22, 24, 26, 28, 30, 42, 46, 48, 54, 56, 62, 64 and 66 are control circuit wires connecting the various elements of the control unit. The element 32 is an acceleration heater for RT, which is a room thermostat, and the elements 34, 36, 38 and 40 are contacts of the room thermostat. The elements 38 and 40 are stationary contacts, and the elements 34 and 36 are movable contacts which move under control of a bimetal or equivalent element responsive to room temperature. The element 36 is a flexible switch blade which engages the stationary contact 40 upon fall of room temperature (or rise of room temperature in the case of a cooling mechanism installation) before the contact 34 engages the contact 38, blade 36 being flexible enough to permit engagement of 34 with 38 and maintain engagement between 36 and 40.

HS is a holding switch to establish a holding circuit across the room thermostat contacts 36 and 40, which holds the relay in until the switch GOS opens. The switch GOS may be termed a "guaranteed on" switch, as it provides a guaranteed minimum operation of the burner, as will hereinafter appear.

The switch DS is pulled in or closed by energization of the relay coil RC, which relay coil also pulls in the holding switch HS, switch MS, which is a motor switch, and switch TS$^3$, which is a timer switch. At the same time, timer switch TS$^4$ is opened. The switch DS is shunted by a delay switch $ds$ through the wires 24, 26, 28 and 30.

The switches $ds$ and GOS and the timer switches TS$^1$ and TS$^2$ are parts of a timer switch such as an electric clock, the energizing coil of which is shown at 56. When the coil is energized it causes rotation of a timer cam 68 having a lobe 70 thereon. The lobe 70 actuates a sliding rod 72 against the action of a return spring 80, the rod having actuating fingers 74, 76 and 78 to engage contact blades 59, 50 and 52 respectively, of the switches TS¹, TS², ds and GOS, as will hereinafter appear.

A dash line 60 is used to indicate the mechanical connection between the armature of the relay coil RC and the switches MS, TS³—TS⁴, HS and DS. The burner B may be of any suitable type, using any suitable fuel, and I have used the term "burner" throughout the specification and claims to indicate broadly a temperature changing element such as a heat generator or a cooling mechanism.

In Fig. 5 I show a modified form of construction wherein many of the elements of the previous figures are present and have been given the same reference numerals. In place of the timing mechanism of the previous figures, Fig. 5 shows a warp switch type of timer for operating the switches ds and GOS, a single timer switch TS being used in place of the four timer switches TS¹, TS², TS³ and TS⁴ of the previous figures. The timing mechanism in this instance is operated by warping of a bimetal 82 under the action of heat from an electric heater 84 wired to the transformer secondary 14 by wires 86, 88 and 90. The timer switch TS controls the circuit for the timing heater 84.

*Practical operation*

Figure 2:
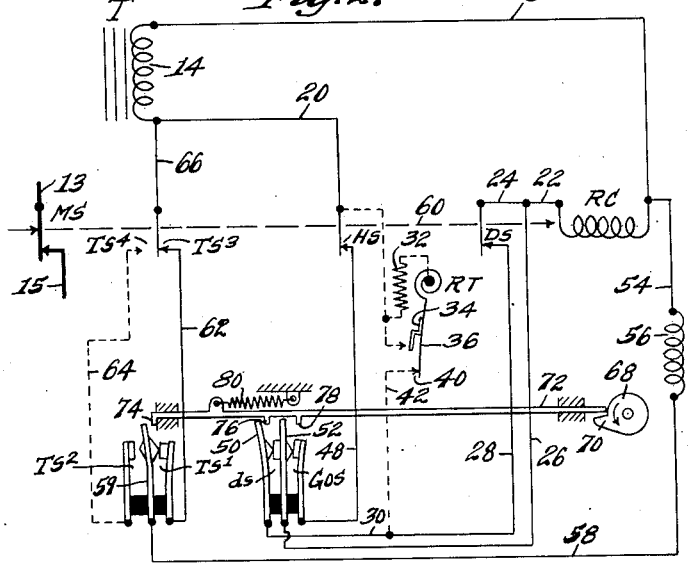
Fig. 2 is a similar view of the right half of Fig. 1 showing the circuit resulting from closure of the room thermostat when it calls for heat.

In the operation of my control unit, when the room thermostat RT calls for heat it will first close the contact 36 on the contact 40, as shown in Fig. 2. A heating cycle initiating circuit can now be traced from the wire 18 through the elements RC, 22, 26, ds, 30, 42, 40, 36, RT, 32 and 46 to the return wire 20. The circuit just traced occurs a fraction of a second before the holding switch HS is closed, and, accordingly, from the wire 30 through the wire 42 to the upper end of the holding switch in Fig. 2, the circuit is shown dotted. A circuit is then established from wire 18 through elements RC, 26, GOS, 48 and HS to return wire 20, and switch DS shunts switch ds so that when switches GOS and ds are open and thermostat RT is still closed, the circuit for relay RC passes through switch DS and thermostat RT. Obviously, therefore, the contact 36 may subsequently leave the contact 40 without stopping the operation of the burner because the holding switch HS is closed.

Incidentally, closure of the switch DS will cause the current to split between the wires 22 and 26, and part of it will flow through the elements 24, DS and 28 to the wires 30 and 42, where it again splits, part of it going through the switches ds and GOS and through 48 and HS to 20, and part of it going through 42, 40, 36, RT, 32 and 46 to the wire 20. This occurs because the current will divide and go through any paths available in proportion to the resistance of such paths. The path through the wire 30 offers much less resistance than through the wire 42 which has the accelerator 32 in it, and, accordingly, the accelerator is effectively shunted by the two described circuits passing from the wires 26 and 30 and through the switch HS so that it has substantially no heating effect on the bimetal coil of the thermostat RT. While these divided circuits occur, the only one having special significance is the one through all three switches ds, GOS and HS, as will be evident from the explanation which follows Closure of the motor switch MS energizes the burner motor M and the ignition mechanism Ign for thereby operating the burner B. Closure of the room thermostat also opened the timer switch TS⁴ and closed the timer switch TS³ so that a circuit is now traceable through the timing mechanism in Fig. 2 as follows: from 18 through 54, 56, 58, TS¹, 62, TS³ and 66 back to the transformer secondary 14. This causes the cam 68 to start rotating so that the lobe 70 starts on its timing cycle represented by one revolution of the cam. During such timing cycle the motor switch MS will positively remain closed because of the holding circuit through HS and GOS.

When the cam 68 reaches the position of Fig. 3, with the rod 72 pushed part way up the lobe of the cam, the actuating fingers 74, 76 and 78 of the rod will have closed the timer switch TS², opened the timer switch TS¹, opened the delay switch ds and after opening it, the switch GOS is opened. Opening of the switch GOS interrupts the holding circuit through the holding switch HS so that control is thrown back on the room thermostat RT, as shown by the solid-line circuit in Fig. 3. If the room thermostat has opened before the expiration of the "guaranteed on" period, which is terminated by the opening of the switch GOS, the burner will stop when the "guaranteed on" period expires, whereas if the room thermostat has not opened, then the condition of Fig. 3 will obtain, and the relay circuit will be opened at the contacts 36 and 40 when the room thermostat is satisfied. The switch GOS, as long as it is closed, insures that the burner will continue to operate during the "guaranteed on" period, which is preferably two or three minutes after the burner starts. The cam 68 can be so geared to the rotor of the timing clock that it will rotate once each two or three minutes, and this period, of course, may be readily adjusted to suit different installations and different fuels, etc. Opening of the switch ds opens the circuit, shunting the switch DS so that the initiating circuit, resulting from closure of the room thermostat, can be had when the switch ds closed, as in Fig. 1, whereas, after the Fig. 3 position is reached, the switch ds does not close until the expiration of a scavenging period. The burner, during the "guaranteed on" period, will continue to operate without the room thermostat having any control whatsoever over the burner.

When the room thermostat is satisfied the contacts 36 and 40 will open as in Fig. 4, thereby opening the relay circuit and permitting the relay to drop back to the position shown, thus shutting down the burner by opening the switch MS. The timer circuit is thereby re-established, this time through the closed timer switch TS², and the timer switch TS⁴ closed by the relay dropping out. Accordingly, the cam 68 will commence to rotate again, and rotation will occur for only a few degrees, whereupon the lobe 70 will have passed the rod 72, and the rod will drop back to the position of Fig. 1, thereby stopping the timer at the position shown in Fig. 1 due to breaking its circuit at the timer switch TS². At the same time, the switches ds and GOS will revert to their closed positions of Fig. 1 for commencement of the next cycle of operation. The time involved in the motion of the cam 68 from the Fig. 4 position to the Fig. 1 position may be termed a "scavenger" timing. This period is relatively short, but it allows the natural draft in the furnace to carry off unburned gases and cool the furnace slightly so that it is in better position for another burner cycle if one should happen to be called for by closure of the room thermostat after the position of Fig. 4 and before the timer had timed out to the Fig. 1 position. For instance, the room thermostat may be set up manually immediately following shut down of the burner by the thermostat.

During the scavenger period the room thermostat cannot re-initiate a control cycle because of both switches DS and ds being open. The scavenger timing can be very accurately controlled by regulating the length of the cam lobe 70. As to the minimum "guaranteed on" period, this can be regulated by the length of time required for the cam to make one revolution, as by regulating the R. P. M. of the cam itself.

Briefly, it may be stated that the switches HS and GOS are in series with each other, so that when both are closed they provide a relay holding circuit shunting out the room thermostat, with the opening of the switch GOS terminating the "guaranteed on" period. The switches DS and ds are in parallel with each other for allowing the control unit to be operated only when either DS or ds is closed.

As to the operation of the heat accelerator 32, when the room thermostat first closes there will be current flow through it, as in Fig. 2, but as soon as the holding switch HS closes, the current is shunted away from it through the elements 30, ds, GOS, 48 and HS, so that the effect of heat acceleration is not had. It is only after the "guaranteed on" period has expired, and the elements of the control circuit are back in the position of Fig. 3 following opening of the "guaranteed on" switch GOS, that the heat accelerator is again energized, and by radiant heat, conduction and/or convection to the bimetal element of the room thermostat accelerates its opening. Thus the acceleration heater is used only at a time when its use is desirable, because prior to that time it is not energized, except momentarily, after the room thermostat closes and before the switches HS and DS close. Consequently, the "guaranteed on" cycle can be completed without interference by the acceleration heater, and if the room thermostat has opened in the meantime, of course there is no need for heat acceleration and the burner is shut down by opening of the switch GOS following the position of Fig. 2 during the heat-up of the furnace.

Fig. 4 shows the circuit in condition for shutdown by opening of the room thermostat at 36—40. However, if the temperature in the room continues to decline after the position of Fig. 4 has been reached, the contact 34 will engage the contact 38, at a temperature something like ½° to 1½° lower than the engagement temperature for the contacts 36 and 40, and this shunts the acceleration heater out of the control circuit by by-passing the current from 36 through 34 and 38 to 46. Since the effect of heat acceleration is not now present, the thermostat will cause the burner to operate continuously until such time as the contact 34 disengages from the contact 38 due to sufficient rise in room temperature affecting the room thermostat. Thereupon the accelerator 32 is energized for performing its function for preventing overrun of the room temperature. In the meantime, however, the thermostat, by closure of the contacts 34 and 38, has assured a continuous and long "on" cycle of the burner (limited, of course, by the limit control LC) to more quickly bring the temperature up to that at which the thermostat is set.

As to the operation of the control unit disclosed in Fig. 5, it is similar to that disclosed in the previous figures, with the difference that the switch ds, normally closed, will be opened by the bimetal element 82 warping to the position shown soon after the heater 84 is energized by closure of the timer switch TS, this switch, of course, being closed due to energization of the relay coil RC. After a time period, which represents the "guaranteed on" timing, and which is adjustable by means of the screw 94, the bimetal element 82 will contact this screw and bend the switch blade 92 to open the switch GOS. Subsequently, when the burner shuts down the bimetal element 82 will cool, and the time which it takes to cool before switch ds is reclosed represents the scavenger timing.

The room thermostat RT preferably has a substantially zero differential of operation. This is made possible by providing the holding switch HS to lock the relay circuit in as soon as it is once made even momentarily, as when the contacts of the room thermostat are almost closed and then momentarily close due to vibration. Thus the holding switch eliminates any chattering of the relay, and once the relay is energized the control circuit is maintained until the "guaranteed on" period has been terminated by opening of the switch GOS.

The various operations described all contribute to holding the room temperature substantially constant. In actual practice I have found that the temperature curve is a much straighter line than is possible with any other type of system with which I am familiar. The advantages of a substantially zero differential thermostat are had with my arrangement, yet all the disadvantages are eliminated, such as chattering (this is taken care of by the holding switch HS) and overrun (this is taken care of by the accelerator 32 operating in the particular manner disclosed).

The over-all result is short and frequent cycling of the burner yet with a minimum operating cycle guaranteed by the timer mechanism. This is necessary with most any automatic heating unit whenever the burner operates, and the short closure period of a minimum-differential room thermostat is objectionable unless some provision is made for such a "guaranteed on" period. If the usual cycling of the burner does not heat up the room to the desired temperature, then a second stage operation comes into effect when the contact 34 closes on the contact 38, thus shunting out the heat accelerator. The effect then is operation on a zero-differential, non-heat-accelerated thermostat, whereas normally, as in Fig. 2, the operation is on a zero-differential, heat-accelerated thermostat arrangement. The maximum room temperature depression experienced in going from heat acceleration to non-heat acceleration in the thermostat is the differential between the closure of contact 36 on contact 40 and the closure of contact 34 on contact 38. It is feasible to set this for less than 1°, which is a narrower differential than has been practiced in most two-stage room thermostats heretofore used. Furthermore, whether the circuit is operating on heat acceleration or non-heat acceleration, the benefits of a zero-differential thermostat are had which results in extreme sensitivity to changes in temperature in the room.

The timing mechanism is preferably of such character that the timing period is substantially constant after it is first set at the time of installing the burner system. An electric clock and a warp switch have been shown merely by way of example. Other suitable types of timing mechanisms may be substituted, and a change of this character, as well as others, may be made without departing from the real spirit and purpose of my invention, and it is my intention to cover by my claims any modified forms of structure or use of mechanical equivalents which may be reasonably included within their scope.

I claim as my invention:

In a burner control of the character disclosed, a room thermostat including contacts which open and close in response to changes in room temperature, a relay coil, a circuit for energizing said relay coil when said room thermostat contacts close, a holding switch in circuit with said relay coil and closeable by energization thereof, an electrically energizable timer mechanism including delay switch contacts and "guaranteed on" switch contacts, a circuit connecting said "guaranteed on" switch contacts in series with said holding switch, a timer switch for said timer mechanism operable upon energization of said relay coil to cause operation of the timer mechanism, means for opening said delay switch and "guaranteed on" switch contacts upon predetermined periods of operation of said timer mechanism, and a circuit connecting said delay switch contacts in series with said room thermostat contacts to energize said relay coil, said "guaranteed on" switch contacts being opened by said timer mechanism after the delay switch contacts open.

ROGER W. BOOTH.

REFERENCES CITED

The following references are of record in the file of this patent:

UNITED STATES PATENTS

| Number | Name | Date |
|---|---|---|
| Re. 17,820 | Garison | Oct. 7, 1930 |
| 1,925,781 | Taylor | Sept. 5, 1933 |
| 2,057,308 | Persons | Oct. 13, 1936 |
| 2,162,116 | Peltz | June 13, 1939 |
| 2,202,731 | Crago | May 28, 1940 |
| 2,205,603 | Schweickart | June 25, 1940 |
| 2,289,283 | Brown | July 7, 1942 |
| 2,373,103 | Deubel | Apr. 10, 1945 |